United States Patent [19]

Thalmann

[11] 4,432,572
[45] Feb. 21, 1984

[54] FLANGE CONNECTION

[75] Inventor: Alfred Thalmann, Uhwiesen, Switzerland

[73] Assignee: Georg Fischer Aktiengesellschaft, Switzerland

[21] Appl. No.: 247,159

[22] Filed: Mar. 24, 1981

[30] Foreign Application Priority Data

Apr. 9, 1980 [CH] Switzerland .................. 2712/80

[51] Int. Cl.³ ............................................ F16L 23/00
[52] U.S. Cl. .................................... 285/412; 285/368; 285/415
[58] Field of Search .............. 285/368, 412, DIG. 12, 285/388, 387, 415, 414

[56] References Cited

U.S. PATENT DOCUMENTS

| 473,462 | 4/1892 | Hogan | 285/387 X |
| 2,374,574 | 4/1945 | Adams, Jr. | 285/368 X |
| 2,632,942 | 3/1953 | Berg et al. | 29/148.2 |
| 2,688,500 | 9/1954 | Scott | 285/DIG. 12 X |
| 3,652,110 | 3/1972 | Manton | 285/328 |
| 3,915,478 | 10/1975 | Al et al. | 285/45 |

FOREIGN PATENT DOCUMENTS

| 630833 | 11/1961 | Canada | 285/412 |
| 410080 | 2/1925 | Fed. Rep. of Germany . | |
| 1267488 | 5/1968 | Fed. Rep. of Germany . | |
| 2459661 | 7/1976 | Fed. Rep. of Germany | 285/368 |
| 584100 | 1/1925 | France | 285/368 |
| 1179405 | 12/1958 | France . | |
| 1217013 | 12/1959 | France . | |
| 450187 | 7/1936 | United Kingdom | 285/368 |
| 820884 | 9/1959 | United Kingdom | 285/368 |

Primary Examiner—Thomas F. Callaghan
Attorney, Agent, or Firm—Roylance, Abrams, Berdo & Goodman

[57] ABSTRACT

A pipe coupling or connection for plastic pipes, at least one of which has an end flange or collar, includes inner and outer rings having mating conical surfaces. The inner ring is plastic and is provided with a slit at one side and one or more thin hinge portions permitting it to be opened for placement over the pipe. The angle of the conical surfaces is chosen so that the resultant of clamping forces does not tend to tilt the rings or the pipe collar.

15 Claims, 5 Drawing Figures

4,432,572

FLANGE CONNECTION

This invention relates to an apparatus for connecting flanged tubular members to each other or for connecting a flanged tubular member to another form of fitting.

BACKGROUND OF THE INVENTION

A flange connection for connecting metallic pipes is shown in German Patent 410080 wherein the coupling is formed by a recess in the pipe and wherein an inner flange ring is developed in two or more parts. The divided inner flange ring makes it possible to radially push the ring on to the pipe part, which provision is indispensable when using the device with an armature or fitting since, in such situations, the flange ring cannot be inserted over the pipe from the other end. In that apparatus, however, it is a disadvantage that the mounting is very cumbersome since the multiple part inner flange ring must be held in position until an outer flange ring can be pushed over it. When using this apparatus on large dimension flanges, the assembly can hardly be accomplished by one person. Moreover, there is the disadvantage that the individual parts of the inside flange ring can tip during the bracing or connection process in which case they do not fit evenly against the outside flange ring, resulting in uneven clamping forces and the loss of the advantage which would otherwise be provided of cone shaped supporting surfaces which are provided to prevent tipping moments at the location of the joint.

Whenever the coupling members are deformed by bending forces and unilateral introduction of force, then a tight connection of the tubular parts can not be achieved with the flange connection. Particularly when the parts are made from a polymeric or plastic material, such deformations occur easily in prior art flange connections and ruptures of the plastic coupling members or leaky connections occur.

BRIEF DESCRIPTION OF THE INVENTION

An object of the present invention is to provide a flange connection which guarantees a tight frictional connection of the tubular parts and makes possible a simple mounting of the parts directly at the place of application without any special auxiliary means.

Briefly described, the invention includes, in an improved apparatus for connecting a tubular member to a fitting or to a similar member, the tubular member having a radially protruding collar with a surface generally perpendicular to the axis of the member, the apparatus being of the type having a first outer flange ring slidable over the collar and a second inner flange ring having a surface for abutting the perpendicular surface of the collar, the outer and inner rings having mating conically shaped surfaces facing each other, the improvement wherein the inner ring is uniterally formed from a plastic, e.g. a polymeric material and includes means defining a radial separating slit, at least film hinge angularly spaced from the slit, and an inner cylindrical peripheral surface adapted to surround the tubular member; and the mating conically shaped surfaces are formed such that a line passing perpendicularly through the center of the mating surfaces intersects the inner cylindrical surface of the inner ring.

Because of the arrangement in the invention of the cone shaped supporting surfaces of both flange rings, the advantage is achieved that the direction of the resultant force developing during clamping of the flanges by means of screws or the like extends in the direction within the point of connection between the clamping part and the collar, as a result of which bending forces on the collar are kept as small as possible and the forces develop only as a result of an axially force acting on the center of the collar. This guarantees a tight frictional flange connection even when the components are produced from plastic. The inside diameter of the outside, uniterally formed, flange ring is developed slightly greater than the outside diameter of the collar. This makes it possible to slip the outer flange ring over the collar axially. Because of the construction of the one-piece inside flange ring provided with a slit and one or more film hinges, the ring can be opened or bent outwardly during mounting to such a point that it can be pushed either from the front over the collar or in a radial direction over part of the pipe.

After bending of the inner flange ring closed, that ring will stay by itself on the pipe part, permitting the mounting of the remaining components to be considerably facilitated.

In order that the manner in which the foregoing and other objects are obtained in accordance with the invention can be understood in detail, particularly advantagous embodiments thereof will be described with reference to the accompanying drawings, which form a part of this specification, and wherein.

Figure 1:
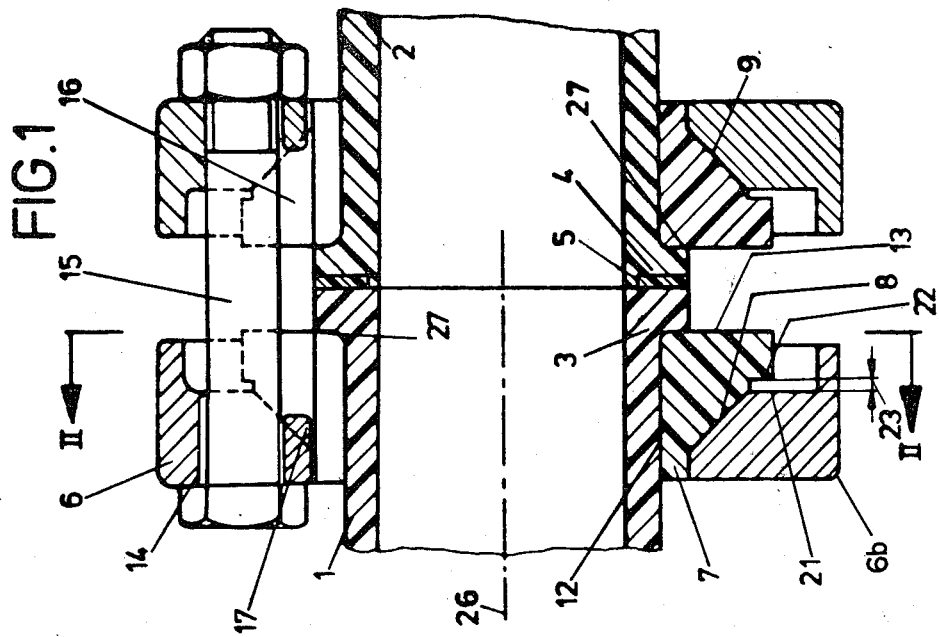
FIG. 1 is a side elevation, in section, of a flange connection in accordance with the invention along line I—I of FIG. 2.
Figure 2:
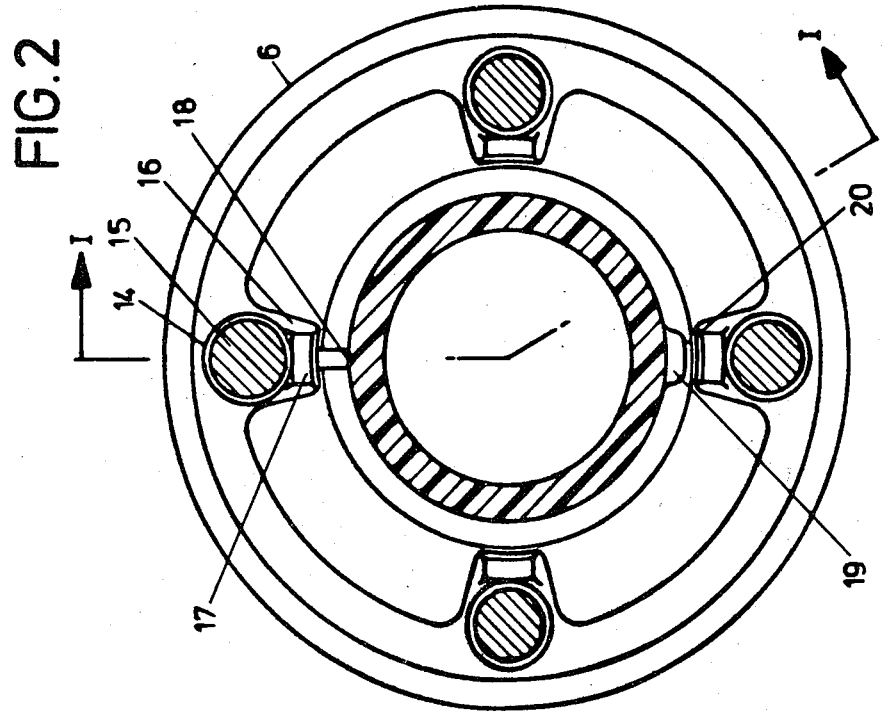
FIG. 2 is a transverse section along line II—II of FIG. 1.

FIGS. 1 and 2 show a flange connection between two tubular or pipe-shaped members 1 and 2, these members having collars 3 and 4 between which a gasket 5 is disposed. Either or both of the two tubular members 1, 2 can be parts of a fitting, of a mounting, of a pipe line, or of a flange bushing of types which are produced from plastic or metal. Each collar 3, 4 has a contact surface 27 extending perpendicularly, or nearly perpendicularly, with respect to the central longitudinal axis 26 of the tubular member.

Figure 4:
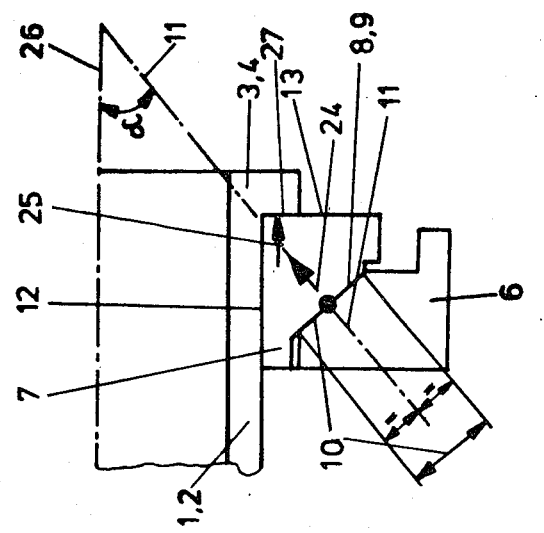
FIG. 4 is a partial side elevation of a portion of the structure of FIG. 1 diagrammatically illustrating the forces acting thereon.

Each flange of the flange connection comprises a loose outside flange ring 6 and a loose inner flange ring 7 having a portion which abuts the contact surface 27 of collar 3 or 4. The inner flange ring 7 has an outside conically shaped peripheral surface 8, and the outside flange ring 6 has an inner conical peripheral surface 9 which surfaces, in the assembled state of the flange connection, mate with and fit against each other. As shown in FIG. 4, the position and slope of a joint supporting surface 10 developed thereby with respect to collars 3, 4, is fixed in such a way that a perpendicular line 11 passing through the middle of the surface 10 formed by the mating conical surfaces, and viewed in section, intersects the inner cylindrical surface 12 of the inner ring. The inside flange ring 7, as shown in FIG. 1, fits with one front surface 13 against supporting surface 27 of the associated one of collars 3 and 4, and preferably the perpendicular line 11 intersects the first half of the inner cylindrical peripheral surface 12 starting out from this front surface 13. The slant of surfaces 8 and 9 or 10, as shown in FIG. 4, is selected such that, at the same time, the perpendicular line 11 forms an acute angle with central axis 26 of between 30° and 60°, preferably about 45° as shown in FIG. 4.

The outside flange ring 6 is provided with evenly distributed holes for passage of tightening screws 15 such that the tightening screws, at the same time, come to lie in recesses 16 formed in the inner flange ring 7.

In the area of the through-bores 14, at the inner periphery of the outside flange ring 6, projections 17 are provided, these projections also being arranged so that they lie in the recesses 16 of the inner flange ring 7. As a result of this, the relative angular positions of the two flange rings 6, 7 are fixed relative to one another even before insertion of the tightening screws 15, thereby considerably facilitating the mounting. Naturally, other arrangements of the projections and recesses are also possible.

The inner flange ring 7 is provided, in the area of one of the recesses 16, with a radial through-slit 18 and at the opposite inner periphery also in the area of a recess 16, the ring 7 has a groove 19 which forms a weakened region permitting the remaining material to act as a flexible thin hinge portion 20.

When using this structure in connection with large diameter tubular members, it is also possible to provide a plurality of such thin hinge portions 20 evenly distributed over the inner ring periphery to permit the ring to be opened adequately.

The outside flange ring 6 and the inside flange ring 7 each have a stop surface 21 or 22 between which, when the flange rings are mutually fitted together, there exists a gap 23. In the event of excessive clamping forces imposed on the flange connection by tightening screws 15, the two stop surfaces 21, 22 abut against each other and thus form a stop for the protection of the flange connection from damage or excessive deformation.

Figure 3:
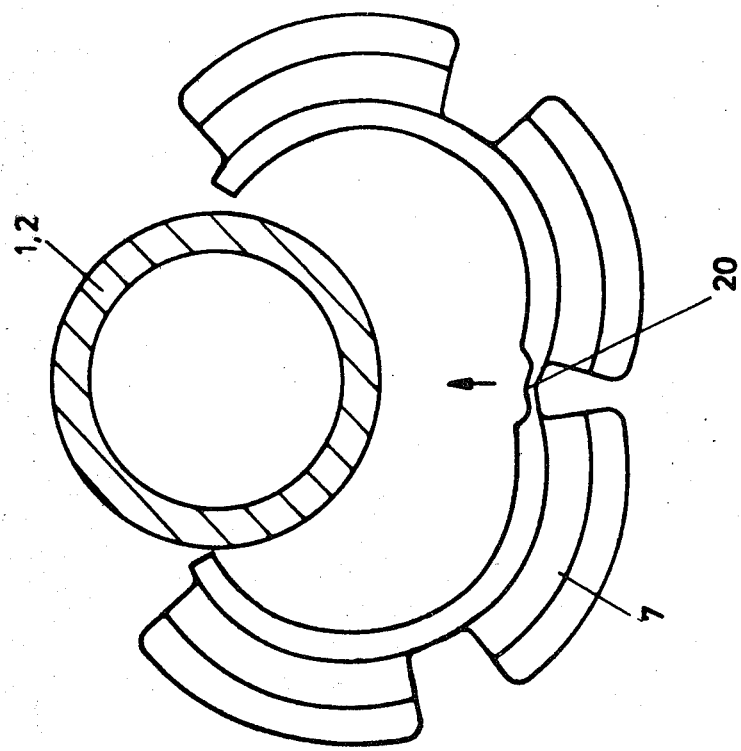
FIG. 3 is a transverse sectional view of a tubular member with an opened inner ring being installed thereon.

In order to assemble the flange connection the outside flange rings 6 are first slipped over the outside diameter of collar 3 or 4 on to the tubular member 1 or 2. Subsequently, as shown in FIG. 3, the inside flange ring 7 is bent sufficiently so that it is opened to permit it to be slipped radially over the tubular member 1 or 2 or, alternatively, slipped axially over the outside diameter of collar 3 or 4. This is possible because of the flexibility of the plastic material in the one or more thin hinge portions 20. After the inside flange ring has been slipped over the tubular member and closed so that it fits against the outside surface of the tubular member 1 or 2, and with its front surface 13 against the collar 3 or 4, the outside flange ring 6 can be slipped over the inner flange ring 7, in the direction of the collar and angularly adjusted so that the relative positions are determined by interengagement of recesses 16 and projections 17, as illustrated in FIG. 2.

The assembly of the two flanges and, thus, of the two tubular members is then completed by inserting, assembling, and tightening the screws or bolts 15.

The tightening bolts produce a resultant force as illustrated by arrow 24 in FIG. 4, perpendicularly to the joint supporting surface 10, the effective line of which coincides with perpendicular line 11. The effective direction of this resultant force along perpendicular line 11 runs, as has already been described, within the connecting place between the tubular member and the collar. At the same time, the axially force acting in the direction of arrow 25 develops which, depending upon the type of construction of the seal, produces little or no bending moment and thus little or no bending deformation on the collar. As a result of that, a perfectly tight and permanently tight flange connection can be achieved when coupling together tubular members produced from plastic.

The inner flange ring 7 also consists of a plastic or polymeric material such as, for example, polyvinyl chloride, polyethylene, polypropylene, or the like. The outside flange ring 6 consists preferably of a glass fiber-reinforced plastic or of metal with or without a coating of plastic 6b. The metal flange can also have some other form of protection against corrosion.

Figure 5:
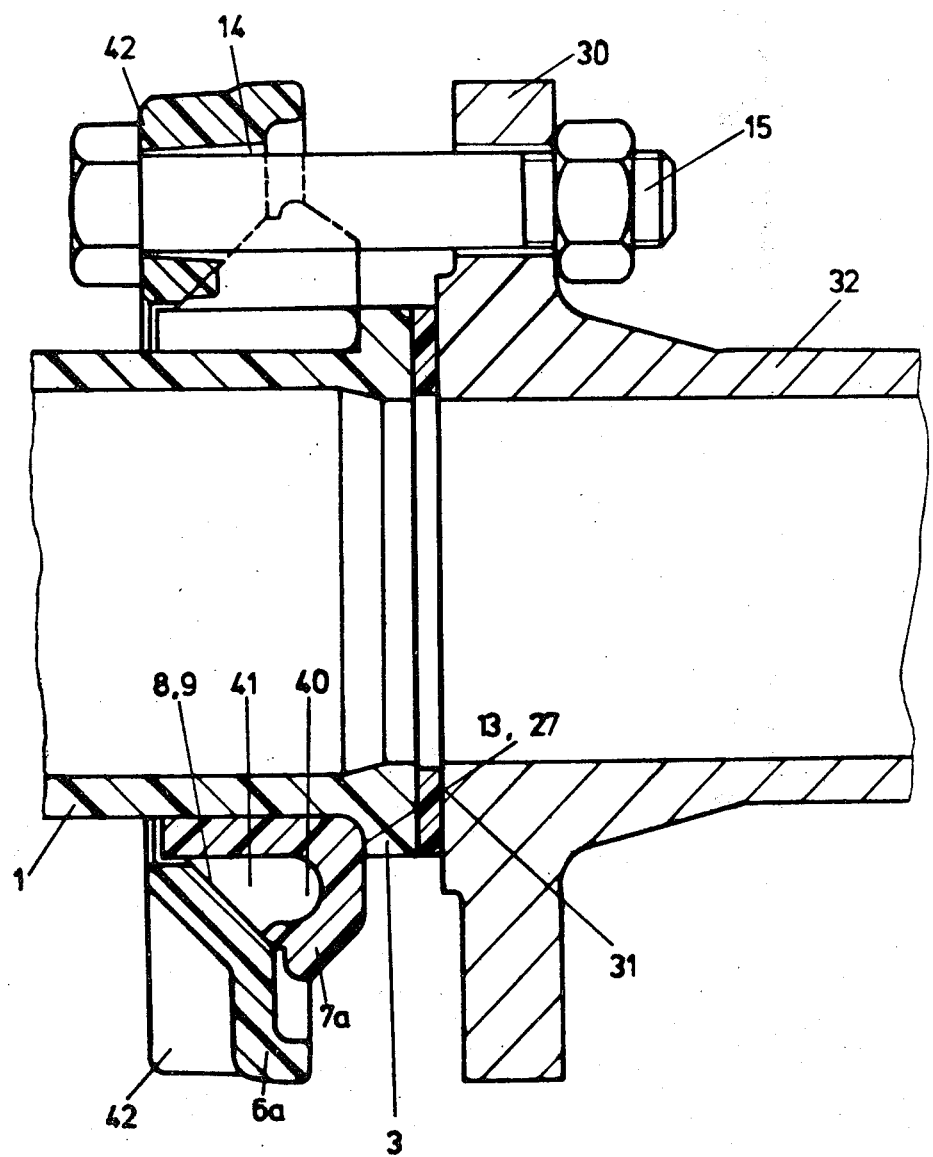
FIG. 5 is a side elevation, in section, of a further embodiment of an apparatus in accordance with the invention.

FIG. 5 illustrates the possibility of interconnecting a tubular member 1 having a collar 3 directly with a flange 30 which is fixedly attached to a pipe shaped part 32 wherein a gasket 31 is disposed between the collar 3 and flange 30. The assembly includes loose inner and outer flange rings 6a and 7a and is clamped by means of tightening bolts 15. The flange 30 can be part, for example, of a machine housing or other coupling member and can consist of metal, for example cast iron or steel, or can be of a polymeric material. The peripheral position, for example, of an operating hand wheel of a coupling is then nevertheless adjustable in addition by the loose flange rings 6a and 7a of the one-sided flange connection in any arbitrary position.

In the embodiment shown in FIG. 5, the two flange rings 6a and 7a are formed as interfitting plastic members without excessive use of material, thereby permitting them to be efficiently produced by a technique such as an injection molding process.

In this embodiment, the inside flange ring 7a has recesses 40 distributed evenly about its periphery, which recesses are separated from each other by ribs 41. The inner conical peripheral surface 9 is formed partially by the ribs 41.

The outside flange ring 6a is provided with eyes 42 in the area of the through-holes 14 so that the flanged ring 6a is provided with adequate stiffness, despite the minimization of the use of material.

While certain advantageous embodiments have been chosen to illustrate the invention it will be understood by those skilled in the art that various changes and modifications can be made therein without departing from the scope of the invention as defined in the appended claims.

What is claimed is:

1. An apparatus for connecting a tubular member having a radially protruding collar with a surface generally perpendicular to the central axis of the member to a fitting or similar member, the apparatus comprising
   a first outer flange ring slidable over the collar;
   a second inner flange ring having a surface for abutting the perpendicular surface of the collar, said inner ring being unitarily formed from a plastic material with a radial separating slit, at least one thin hinge portion angularly spaced from said slit and an inner cylindrical peripheral surface for surrounding the tubular member;
   mating conically shaped surfaces facing each other on said inner and outer rings, said mating conically shaped surfaces being formed such that a line passing perpendicularly through the center of said mating conically shaped surfaces intersects said inner cylindrical surface of said inner ring;

a plurality of circularly spaced recesses in one of said rings;

a plurality of projections in the other of said rings arranged to mate with said recesses establishing a relative angular relationship therebetween;

a plurality of threaded fasteners mounted in said outer ring for urging the tubular member toward the fitting or similar member; and a stop surface on each of said inner and outer rings, said stop surfaces normally being in parallel spaced facing relationship for providing a stop when said apparatus is subjected to excessive force.

2. An apparatus according to claims 1 wherein each of said conically shaped surfaces lies at an angle of between about 30° and about 60° relative to the central axis of said tubular member.

3. An apparatus according to claim 2 wherein said outer ring is formed from a reinforced plastic material.

4. An apparatus according to claim 2 wherein said outer ring is formed from metal.

5. An apparatus according to claim 4 wherein said outer ring includes a corrosion resistant coating.

6. An apparatus according to claim 1 wherein said outer ring is formed from a reinforced plastic material.

7. An apparatus according to claim 1 wherein said outer ring is formed from metal.

8. An apparatus according to claim 7 wherein said outer ring includes a corrosion resistant coating.

9. An apparatus according to claim 1 wherein said recesses and projections are circularly aligned with said threaded fasteners.

10. An apparatus for connecting a tubular member having a radially protruding collar with a surface generally perpendicular to the central axis of the member to a fitting or similar member, the apparatus comprising a first outer flange ring slidable over the collar;

a second inner flange ring having a surface for abutting the perpendicular surface of the collar and an inner cylindrical peripheral surface for surrounding the tubular member;

mating conically shaped surfaces facing each other on said inner and outer rings, said mating conically shaped surfaces being formed such that a line passing perpendicularly through the center of said mating conically shaped surfaces intersects said inner cylindrical surface of said inner ring;

a plurality of circularly spaced recesses in one of said rings;

a plurality of projections in the other of said rings arranged to mate with said recesses establishing a relative angular relationship therebetween;

a plurality of threaded fasteners mounted in said outer ring for urging the tubular member toward the fitting or similar member; and a stop surface on each of said inner and outer rings, said stop surfaces normally being in parallel spaced facing relationship for providing a stop when said apparatus is subjected to excessive force.

11. An apparatus according to claim 10 wherein each of said conically shaped surfaces lies at an angle of between about 30° and about 60° relative to the central axis of said tubular member.

12. An apparatus according to claim 10 wherein said outer ring is formed from a reinforced plastic material.

13. An apparatus according to claim 10 wherein said outer ring is formed from metal.

14. An apparatus according to claim 13 wherein said outer ring includes a corrosion resistant coating.

15. An apparatus according to claim 10 wherein said recesses and projections are circularly aligned with said threaded fasteners.

* * * * *